United States Patent
Wallenius

(10) Patent No.: US 6,304,652 B1
(45) Date of Patent: *Oct. 16, 2001

(54) MERGING OF CALLS

(75) Inventor: Jukka Wallenius, Helsinki (FI)

(73) Assignee: Nokia Telecommunications Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,505
(22) PCT Filed: Nov. 13, 1997
(86) PCT No.: PCT/FI97/00692
§ 371 Date: Jul. 10, 1998
§ 102(e) Date: Jul. 10, 1998
(87) PCT Pub. No.: WO98/21901
PCT Pub. Date: May 22, 1998

(30) Foreign Application Priority Data

Nov. 14, 1996 (FI) .......... 964570

(51) Int. Cl.$^7$ ............ H04M 3/50
(52) U.S. Cl. ............ 379/230; 379/202
(58) Field of Search .......... 379/230, 231, 379/232, 234, 235, 236, 202, 203, 204, 205, 206, 207

(56) References Cited

U.S. PATENT DOCUMENTS

| | | | |
|---|---|---|---|
| 5,408,518 | 4/1995 | Yunoki | 379/67 |
| 5,461,669 | * 10/1995 | Vilain | 379/220 |
| 5,491,798 | * 2/1996 | Bonsall et al. | 379/202 |
| 5,590,186 | * 12/1996 | Liao et al. | 379/210 |
| 5,838,768 | * 11/1998 | Sumar et al. | 379/89 |
| 6,005,845 | * 12/1999 | Svennesson et al. | 379/202 |

FOREIGN PATENT DOCUMENTS 569 180   11/1993   (EP) .
713 319   5/1996    (EP) .

OTHER PUBLICATIONS

"Intelligent Network User's Guide for Capability Set 1" Recommendation Q.1219, (Geneva 1994) pp. 1–78.

* cited by examiner

Primary Examiner—Ahmad Matar
Assistant Examiner—William J. Deane, Jr.
(74) Attorney, Agent, or Firm—Pillsbury Winthrop LLP

(57) ABSTRACT

Conference call set-up is conventionally controlled with special keys # and * of a telephone set. Today these functions are performed by means of intelligent network technology. A problem with standard CS-1 and CS-2 intelligent network architectures is that they do not allow merging of call segments initiated by a Service Control Point (SCP). According to the invention: in response to the messages from the service control function (SCF), the service switching point (SSP) creates a separate call segment for each B subscriber; in response to the creation of a call segment (CS1–CS3), the service switching point (SSP) sends a message about this to the service control function (SCF); in response to a message confirming the creation of at least two call segments (CS1–CS3), the service control function (SCF) orders the service switching point (SSP) to merge the call segments created.

33 Claims, 1 Drawing Sheet

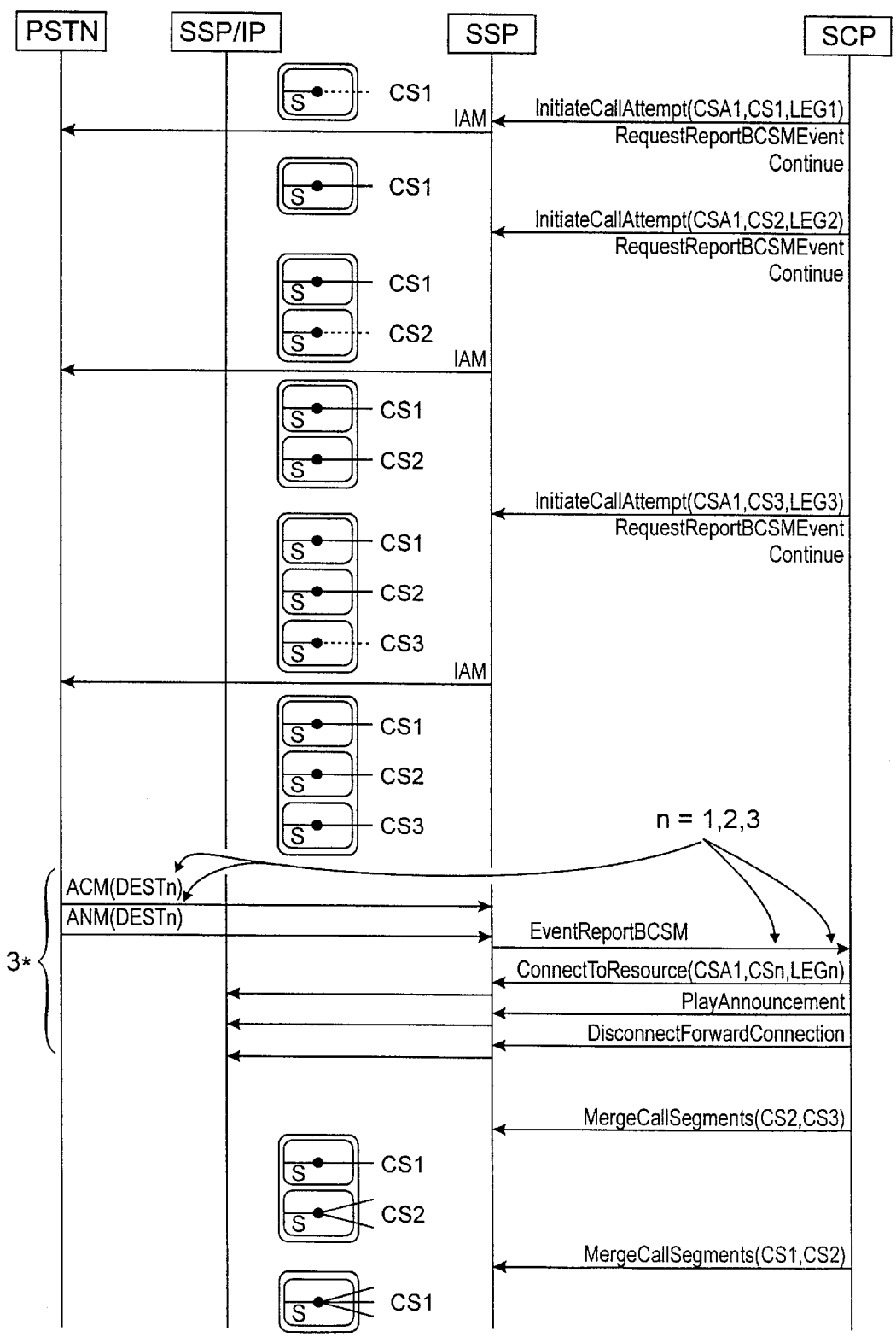

MERGING OF CALLS

This application is the national phase of international application PCT/FI97/00692 filed Nov. 13, 1997 which designated the U.S.

BACKGROUND OF THE INVENTION

The invention relates to a mechanism improving the operations of an Intelligent Network (IN) for merging calls initiated by the intelligent network and for producing services to subscribers.

An intelligent network provides a subscriber of a telecommunication network—such as a wired network or a mobile telephone network—with a host of different services. These services include e.g. a Private Numbering Plan (PNP), enabling the use of private numbers, and a Personal Number which allows the users to call a specific person using the same number, irrespective of the person's location and the subscriber connection used for receiving calls. A specific numbering block is defined for PBX subscribers in the numbering domain of the exchange. One example of this kind of an intelligent network is described in the recommendations of ITU-T Q-1200 series, of which Q-1210–Q-1219 define the set of features known as CS-1 (Capability Set 1) and, correspondingly, Q-1220–Q-1229 define the set of features CS-2. The present invention suggests an improvement to the call set-up mechanism presented in recommendation Q-1214. This recommendation defines functions such as Service Control Function (SCF) and Service Switching Function (SSF). A network element performing the SCF is called a Service Control Point (SCP). Similarly, a network element performing the SSF is called a Service Switching Point (SSP).

A Basic Call State Model BCSM defined in connection with an intelligent network describes the different stages of call control and includes the points where call control can be interrupted for initiating an intelligent network service. It identifies those Event Detection Points in the call and the connection process where service logic entities of the intelligent network can have an interactive relationship with basic call and connection management features.

One of the services offered by telecommunication operators is a conference call. The problem with the general mechanisms for setting up a conference call is that they require considerable skill and care from the subscriber, because conference call set-up must be controlled using special keys # and * of the telephone set. Such problems relating to the convenience of use are often solved by means of an intelligent network architecture. The problem with CS-1 and CS-2 intelligent network architectures is that they do not include the possibility of merging call segments initiated by a Service Control Function SCF. For instance, CS-2 architecture entities CallSegmentAssociation, CallSegment, SSF FSM and the MergeCallSegments operation in the BCSM SDL-model are not possible for calls which the service control function SCF has initiated with the operation InitiateCallAttempt. In other words, within the ITU-T and ETSI draft recommendations this operation is not allowed, but the draft recommendations define the states in which the MergeCallSegments operation is allowed, and this situation is not one of them.

BRIEF SUMMARY OF THE INVENTION

The object of the present invention is thus to provide a method for producing services in such a way that the above-mentioned problems relating to production of services can be solved.

The invention is based on complementing an intelligent network architecture so as to enable automatic merging of calls, without the subscriber controlling the merging with the keys of a terminal. At a predetermined time, the exchange sets up a conference call by calling the conference participants, i.e. the B subscribers. The answer-signal received from the telephone network about the call being connected to each B subscriber serves as a signal for the service control point SCP of the intelligent network. On the basis of the answer-signal, the SCP commands the SSP to merge the calls.

BRIEF DESCRIPTION OF THE DRAWINGS

The invention will now be described in more detail, in connection with a preferred embodiment, with reference to the attached drawing in which FIG. 1 provides an example of a signalling diagram illustrating the invention.

DETAILED DESCRIPTION OF THE INVENTION

FIG. 1 illustrates a method for setting up a conference call between three B subscribers. The events in the figure proceed from top to bottom and they are described accordingly. The service control point SCP commands the service switching point SSP to set up a first call segment to a first B subscriber. Parameters CSA1, CS1 and LEG1 have been appended to this InitiateCallAttempt message by way of an example. A leg is a connection to the subscriber. A CS (CallSegment) corresponds to one call. A CSA (CallSegmentAssociation) is logical the joining of two or more call segments.

Other messages and parameters can be used as well. The symbols placed to the left of the SSP illustrate setting up and connecting of calls. A surrogate leg S means that there is no connection to a real subscriber. A call segment indicated by a dashed line means that the connection is being created, and a call segment shown with a continuous line means that the connection has been established. In connection with an InitiateCallAttempt message, the SCP also sends a RequestReportBCSMEvent message by which it asks the SSP to report when the event detection point has been reached (the connection has been established). With a Continue message, the SCP commands the SSP to initiate the defined events. As a result of this, the SSP sends an Initial Address Message IAM to the telephone network for setting up a call to a first B subscriber. The events are repeated for a second and a third B subscriber, after which three logical connections to three B subscribers have been established in the SSP call model.

The B subscribers 1, 2 and 3 each answer the call and the network submits for each B subscriber first an Address Complete Message (ACM) and then an ANswer Message (ANM). In connection with the latter, the event detection point mentioned above is triggered, and the SSP reports this to the SCP. The establishment of a conference call can be informed to B subscribers in such a way that the SCP sends the messages ConnectToResource, PlayAnnouncement and DisconnectForwardConnection to the SSP. The first one of these messages defines the resources needed for transmitting an announcement, the second one causes the announcement to be read to a B subscriber and the third one releases the resources reserved for the announcement. For each of these three messages, the SSP sends the SSP/IP (IP=Intelligent Peripheral) a corresponding command on the basis of which the SSP/IP reads an audio announcement to the B subscriber.

The phases indicated by a brace in FIG. 1 are repeated for each B subscriber with n values 1,2 and 3. After receiving an ANswer Message and the subsequent notification of the triggering of the event detection point from all B subscribers 1, 2 and 3, the SCP commands the SSP to merge the call segments two at a time. The figure shows an example where segments 2 and 3 are merged first and then segments 1 and 2. The result is a single call segment with no A subscriber, but a Surrogate Leg S in place of the A subscriber, and with three B subscribers. The reason for merging call segments two at a time is that known intelligent network messages (in this case MergeCallSegments) include two call segments as parameters, so n call segments may be merged by performing n-1 MergeCallSegment operations. If the intelligent network used recognizes a message allowing several call segments to be merged by a single operation, such a message can naturally be employed.

The invention therefore requires for instance the following deviations from the ITU-T and ETSI draft recommendations. When two call segments initiated by the SCP (for example CS2 and CS3) are merged, the passive legs (the connections set up to real subscribers) are transferred from one call segment (CS3) to the target call segment (CS2) and the surrogate legs S in the source call segment (CS3) are deleted so that only one surrogate leg S will be left in the target call segment (CS2).

The embodiment described above is only one example of implementing the invention. For instance, it is not technically necessary to have all the call segments created before their merging begins. However, it is more convenient for the subscribers that the merging of the call segments only starts after they all have been created. Hearing a ringing tone during the call will thus be avoided. It is also technically possible to merge the call segments without an audio announcement (PlayAnnouncement) to the B subscribers. However, in this case the B subscribers would need to constantly ask who are presently connected to the conference.

The method of the invention only requires fairly minor changes to a previously known intelligent network architecture. Although the described conference call is between three parties, it is apparent that the technology can be applied to an arbitrary number of conference parties. The invention is therefore not restricted to the preferred embodiments described above but it may vary within the scope of the claims.

What is claimed is:

1. A method for establishing a conference call with a plurality of called subscribers in a telecommunications network including a service control point (SCP) and a service switching point (SSP), the method comprising:

in response to messages from the service control point (SCP), the service switching point (SSP) creates a separate call segment to each of the plurality of called subscribers of said conference call;

in response to the creation of said call segment, the service switching point (SSP) sends a message relating to the creation of said call segment to the service control point (SCP); and in response to a message confirming the creation of at least two call segments, the service control point (SCP) orders the service switching point (SSP) to merge the call segments created for each said called subscriber of said conference call.

2. The method according to claim 1, wherein the service control point orders the service switching point (SSP) to merge the call segments when the service switching point has received a message indicating creation of call segments for each called subscriber of said conference call.

3. The method according to claim 1, wherein the service switching point (SSP) produces an audio announcement to the called subscribers before merging call segments.

4. The method according to claim 1, wherein the call segments are merged two at a time.

5. The method according to claim 1, wherein all the call segments are merged by the same operation.

6. The method according to claim 1, wherein said call segments may comprise actual connections to real subscribers and surrogate legs, said merging of at least two of the call segments comprising transferring the actual connections from a source call segment to a target call segment and deleting the surrogate legs of the source call segment, leaving a single surrogate leg in the target call segment.

7. The method according to claim 1, wherein the message from the service control point (SCP) to the service switching point (SSP) for merging said call segments is a MergeCallSegments message.

8. The method according to claim 1, wherein the message from the service control point (SCP) to the service switching point (SSP) for merging call segments is a MergeCallSegments message.

9. An arrangement for merging call segments of several receiving subscribers of a conference call initiated in a telecommunication network comprising a service control point (SCP) and a service switching point (SSP), the arrangement comprising:

the service switching point (SSP) is arranged to create a separate call segment for each of the receiving subscribers, in response to messages from the service control point (SCP);

the service switching point (SSP) is arranged to send a message to the service control point (SCP) in response to the creation of a call segment; and the service control point (SCP) is arranged to command the service switching point (SSP) to merge the call segments created in response to a message informing of the creation of at least two call segments.

10. A method of merging call segments to set-up a conference call between an originating subscriber and a plurality of receiving subscribers, the method comprising:

creating a separate call segment by a service switching point in a telecommunications network for each of the receiving subscribers, the creating being in response to a message sent to the service switching point from a service control point;

transmitting a plurality of messages from the service switching point to the service control point in the telecommunications network, each of the plurality of messages (i) corresponding to one of the subscribers and (ii) indicating successful creation of the call segment; and ordering the service switching point to merge the call segments created when the message from the service switching point indicates at least two call segments have been created.

11. The method of claim 10, further including producing an audio announcement, from the service switching point, to the receiving subscribers before merging call segments.

12. A method according to claim 1, further comprising collecting all information necessary for establishing said conference call at said SCP before creating any of said call segments.

13. A method according to claim 12, wherein at a point in time during collection of said information, the SCP spontaneously begins to establish said conference call.

14. A method according to claim 2, further comprising collecting all information necessary for establishing said conference call at said SCP before creating any of said call segments.

15. A method according to claim 14, wherein at a point in time during collection of said information, the SCP spontaneously begins to establish said conference call.

16. A method according to claim 3, further comprising collecting all information necessary for establishing said conference call at said SCP before creating any of said call segments.

17. A method according to claim 16, wherein at a point in time during collection of said information, the SCP spontaneously begins to establish said conference call.

18. A method according to claim 4, further comprising collecting all information necessary for establishing said conference call at said SCP before creating any of said call segments.

19. A method according to claim 18, wherein at a point in time during collection of said information, the SCP spontaneously begins to establish said conference call.

20. A method according to claim 5, further comprising collecting all information necessary for establishing said conference call at said SCP before creating any of said call segments.

21. A method according to claim 20, wherein at a point in time during collection of said information, the SCP spontaneously begins to establish said conference call.

22. A method according to claim 6, further comprising collecting all information necessary for establishing said conference call at said SCP before creating any of said call segments.

23. A method according to claim 22, wherein at a point in time during collection of said information, the SCP spontaneously begins to establish said conference call.

24. A method according to claim 7, further comprising collecting all information necessary for establishing said conference call at said SCP before creating any of said call segments.

25. A method according to claim 24, wherein at a point in time during collection of said information, the SCP spontaneously begins to establish said conference call.

26. A method according to claim 8, further comprising collecting all information necessary for establishing said conference call at said SCP before creating any of said call segments.

27. A method according to claim 26, wherein at a point in time during collection of said information, the SCP spontaneously begins to establish said conference call.

28. A method according to claim 9, further comprising collecting all information necessary for establishing said conference call at said SCP before creating any of said call segments.

29. A method according to claim 28, wherein at a point in time during collection of said information, the SCP spontaneously begins to establish said conference call.

30. A method according to claim 10, further comprising collecting all information necessary for establishing said conference call at said SCP before creating any of said call segments.

31. A method according to claim 30, wherein at a point in time during collection of said information, the SCP spontaneously begins to establish said conference call.

32. A method according to claim 11, further comprising collecting all information necessary for establishing said conference call at said SCP before creating any of said call segments.

33. A method according to claim 32, wherein at a point in time during collection of said information, the SCP spontaneously begins to establish said conference call.

* * * * *